United States Patent
Walker et al.

(10) Patent No.: US 12,505,105 B2
(45) Date of Patent: Dec. 23, 2025

(54) QUERY MANAGEMENT SYSTEM FOR APPLICATION SERVICE PLATFORM

(71) Applicant: Figma, Inc., San Francisco, CA (US)

(72) Inventors: Braden Walker, San Francisco, CA (US); Lin Xu, San Francisco, CA (US); Matthew Rosencrantz, San Francisco, CA (US)

(73) Assignee: Figma, Inc., San Francisco, CA (US)

( * ) Notice: Subject to any disclaimer, the term of this patent is extended or adjusted under 35 U.S.C. 154(b) by 0 days.

(21) Appl. No.: 18/979,009

(22) Filed: Dec. 12, 2024

(65) Prior Publication Data
US 2025/0200047 A1    Jun. 19, 2025

Related U.S. Application Data (60) Provisional application No. 63/609,866, filed on Dec. 13, 2023.

(51) Int. Cl.
  *G06F 16/242*    (2019.01)
  *G06F 16/2455*   (2019.01)

(52) U.S. Cl.
  CPC .... *G06F 16/24552* (2019.01); *G06F 16/2423* (2019.01)

(58) Field of Classification Search
  CPC ................. G06F 16/24552; G06F 16/2423
  See application file for complete search history.

(56) References Cited

U.S. PATENT DOCUMENTS

| | | | | |
|---|---|---|---|---|
| 6,826,557 | B1 * | 11/2004 | Carter | G06F 16/24552 |
| 8,903,806 | B2 * | 12/2014 | Ruiz | G06F 16/2423 |
| | | | | 707/718 |
| 8,954,469 | B2 * | 2/2015 | Dhillon | G06F 16/2428 |
| | | | | 707/779 |
| 10,089,350 | B2 * | 10/2018 | Nguyen | G06F 16/2425 |
| 10,657,064 | B1 * | 5/2020 | Khan | G06F 16/00 |
| 10,678,697 | B1 * | 6/2020 | Iyer | H04L 67/5682 |
| 11,113,294 | B1 * | 9/2021 | Bourbie | G06F 16/24568 |
| 2003/0097355 | A1 * | 5/2003 | Kapitskaia | G06F 16/24552 |
| 2004/0267824 | A1 | 12/2004 | Pizzo et al. | |
| 2005/0120181 | A1 * | 6/2005 | Arunagirinathan | G06F 16/9574 |
| | | | | 707/E17.12 |

(Continued)

OTHER PUBLICATIONS

Choi et al., "Template-Based Runtime Invalidation for Database-Generated Web Contents", 2004, Springer-Verlag Berlin Heidelberg, APWeb 2004, LNCS 3007, pp. 755-764 (Year: 2004).*

(Continued)

*Primary Examiner* — Jorge A Casanova
(74) *Attorney, Agent, or Firm* — Squire Patton Boggs LLP; Sarah Mirza

(57) ABSTRACT

In examples, a query management system maintains a query schema for a structured data source. The query schema includes a collection of query templates, where each query template specifies at least one condition. When a mutation in an underling data source is detected, the query management system generates an invalidation command for a corresponding set of cached keys. Based on attributes of the mutated data set, the query template can enable the use of wildcard designations to for purpose of identifying cache keys that are to be invalidated as a result of the mutated data set.

20 Claims, 7 Drawing Sheets

(56) References Cited

U.S. PATENT DOCUMENTS

| | | | |
|---|---|---|---|
| 2014/0082013 A1* | 3/2014 | Wolf | G06F 16/245 |
| | | | 707/769 |
| 2014/0279944 A1 | 9/2014 | Ghandeharizadeh et al. | |
| 2014/0310293 A1* | 10/2014 | Knoll | G06F 16/24552 |
| | | | 707/756 |
| 2016/0267293 A1* | 9/2016 | Subbiah | G06F 16/24534 |
| 2019/0146920 A1* | 5/2019 | Hua | G06F 12/0891 |
| | | | 711/141 |
| 2019/0236156 A1* | 8/2019 | Fanghaenel | G06F 16/2246 |
| 2021/0286815 A1 | 9/2021 | Aylett et al. | |
| 2023/0037412 A1* | 2/2023 | Kementsietsidis | |
| | | | G06F 16/2455 |

OTHER PUBLICATIONS

International Search Report received for Application No. PCT/US2024/059890, dated Feb. 20, 2025, 12 pages.

\* cited by examiner

FIG. 3C shape:files_in_folder ⟵411  410
SELECT id FROM files WHERE folder_id = $1

| id | filename | updated_at | folder_id |
|---|---|---|---|
| 193 | "LiveGraph Slides" | 2023-10-29 | 81 |
| 193 | "LiveGraph Slides" | 2023-10-29 | 212 |

FIG. 4B

SELECT id FROM files WHERE folder_id =81  422

SELECT id FROM files WHERE folder_id =212  424

FIG. 4C

```
shape:recent_drafts
   SELECT id
   FROM files
   WHERE folder_id = $1 AND updated_at > $2
   ORDER BY updated_at DESC
   LIMIT 100
```

FIG. 5A

| id | filename | updated_at | folder_id |
|----|----------|------------|-----------|
| 193 | "LiveGraph Slides" | 2023-10-29 | 212 |
| 193 | "LiveGraph Slides" | 2023-11-05 | 212 |

FIG. 5B invalidates recent_drafts(212, *)

FIG. 7B

QUERY MANAGEMENT SYSTEM FOR APPLICATION SERVICE PLATFORM

RELATED APPLICATION(S)

This application claims benefit of priority to Provisional U.S. Patent Application No. 63/609,866, filed Dec. 13, 2023, the aforementioned priority application being hereby incorporated by reference in its entirety.

TECHNICAL FIELD

Examples relate to a query management system for an application service platform.

BACKGROUND

Many application service platforms exist that enable end users to share, view and/or collaborate on different types of data, such as user-generated content. For example, an application service platform can enable design users to operate client computers to collaborate on the creation of graphic designs.

An application service platform can utilize different types of data and data sources. An application service platform can use structured data sets to enable client computers to retrieve and render metadata, overlay and/or supplementary data. For example, in the context of an application service platform for enabling collaboration on graphic designs, an application service platform can utilize databases, including database shards, to provide data sets representing comments (e.g., comments that overlay or appear to the side of a collaboration project), and overlays. As another example, an instance of an application service implemented through the platform can reference, link or otherwise utilize file and folder names of resources used by the application service, as well as user name or profile information. Data such as for comments (which can utilize, for example, user information and filenames), file and folder names, can be retrieved from structured data sources, such as database shards.

Figure 7A:
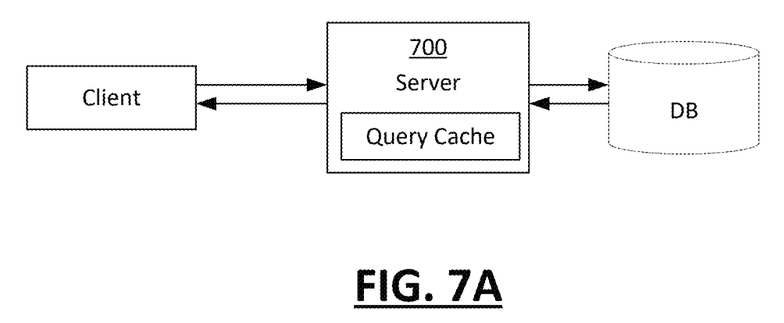
FIG. 7A illustrates a conventional network system for implementing an application service platform that enables client retrieval of data sets from structured data sources.

FIG. 7A illustrates a conventional network system for implementing an application service platform that enables client retrieval of data sets from structured data sources. A system 700 can utilize, for example, a query language for exposing application program interfaces (API), and more generally structured language queries. By way of example, a system can utilize a data fetching layer (e.g., LIVEGRAPH, provided by FIGMA INC.) between frontend components and back end databases, where data objects have predefined relationships with one another. A client computer generates queries for data sets that it utilizes. The queries generated by a client can result in the return of a view, which can include, for example, a portion of a graph data structure maintained by one or multiple database shards. The data sets can themselves be structured to identify relationships with other data sets, as well as data that indicates how related data sets are to be traversed to provide the subscription view.

In order for a network system to effectively implement a real-time environment, the system 700 typically caches queries and query results, to enable faster data retrieval. Further, as the number of clients increase, the system 700 enables classes subscribe to queries, where data of interest is provided automatically and in response to updates to the structured data source. Changes to the database can be identified as mutations. When such mutations occur, processes associated or implemented with the database identify relevant queries which may be affected by the mutation. Through identification of mutations, the system can invalidate cache keys for relevant queries, in order for the cache resources to maintain consistent views of the database.

An application service can scale to, for example, accommodate a greater number of users and data sets. For example, the volume of data sets which are used by the client computers can increase with a greater number of clients, greater use by individual clients, and also the progression of time where users maintain previously generated data and add new data. Additionally, the application service platform can increase the services and types of data which are in use.

Figure 7B:
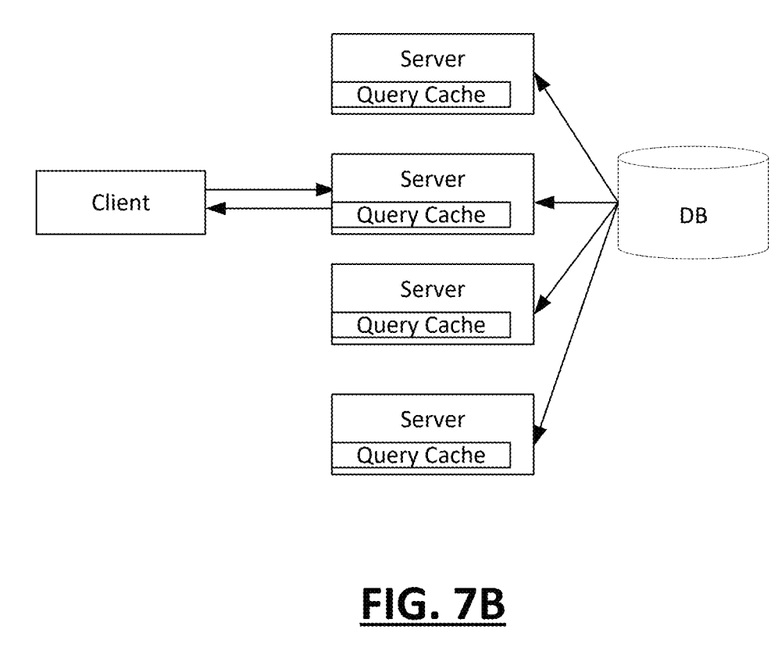
FIG. 7B illustrates a conventional network system where an application service platform is scaled to that enables client retrieval of data sets from structured data sources.

FIG. 7B illustrates a conventional network system where an application service platform is scaled to enable client retrieval of data sets from structured data sources. Under conventional approaches, the network system is scaled by increasing the number of servers used to enable client retrieval of data sets. However, scaling under conventional approaches raises numerous problems. Among these problems, notifications of mutations must be fanned out to each server/cache. Further, to accommodate database shards, every server must fan-in mutations as they arise. Fanning-in and out creates bottlenecks and efficiencies which reduce the responsiveness of the system, which can be particularly problematic when real-time environments are desired.

DETAILED DESCRIPTION

Examples provide for a query management system that enables multiple clients to maintain a consistent, real-time view of structured data sets that are actively in use by computing resources of an application service platform. Among other advantages, the query management system includes a highly scalable architecture that provides a consistent, real-time view of structured data sets in use by client computers. Additionally, a query management system as described reduces the computing resources and processes that would otherwise be required for enabling such consistent views to be maintained.

As described with examples, a query management system is provided that is highly scalable. In particular, the query management system can scale without raising issues of fanning in/out, which exists under conventional approaches.

Still further, in examples, a query management system maintains a query schema for a structured data source. The query schema includes a collection of query templates, where each query template specifies at least one condition. When a mutation in an underling data source is detected, the query management system generates an invalidation command for a corresponding set of cached keys. Based on attributes of the mutated data set, the query template can enable the use of wildcard designations for the purpose of identifying cache keys that are to be invalidated as a result of the mutated data set.

One or more examples described herein provide that methods, techniques, and actions performed by a computing device are performed programmatically, or as a computer-implemented method. Programmatically, as used, means through the use of code or computer-executable instructions. These instructions can be stored in one or more memory resources of the computing device. A programmatically performed step may or may not be automatic.

Additionally, one or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs, or machines.

Moreover, examples described herein can generally require the use of specialized computing devices, including processing and memory resources. For example, one or more examples described may be implemented, in whole or in part, on computing devices such as servers, desktop computers, cellular or smartphones, laptop computers, printers, digital picture frames, network equipment (e.g., routers), wearable computing devices, and tablet devices. Memory, processing, and network resources may all be used in connection with the establishment, use, or performance of any example described herein (including with the performance of any method or with the implementation of any system). For instance, a computing device coupled to a data storage device storing the computer program and configured to execute the program corresponds to a special-purpose computing device. Furthermore, any computing systems referred to in the specification may include a single processor, or architectures employing multiple processor designs for increased computing capability.

Figure 1:
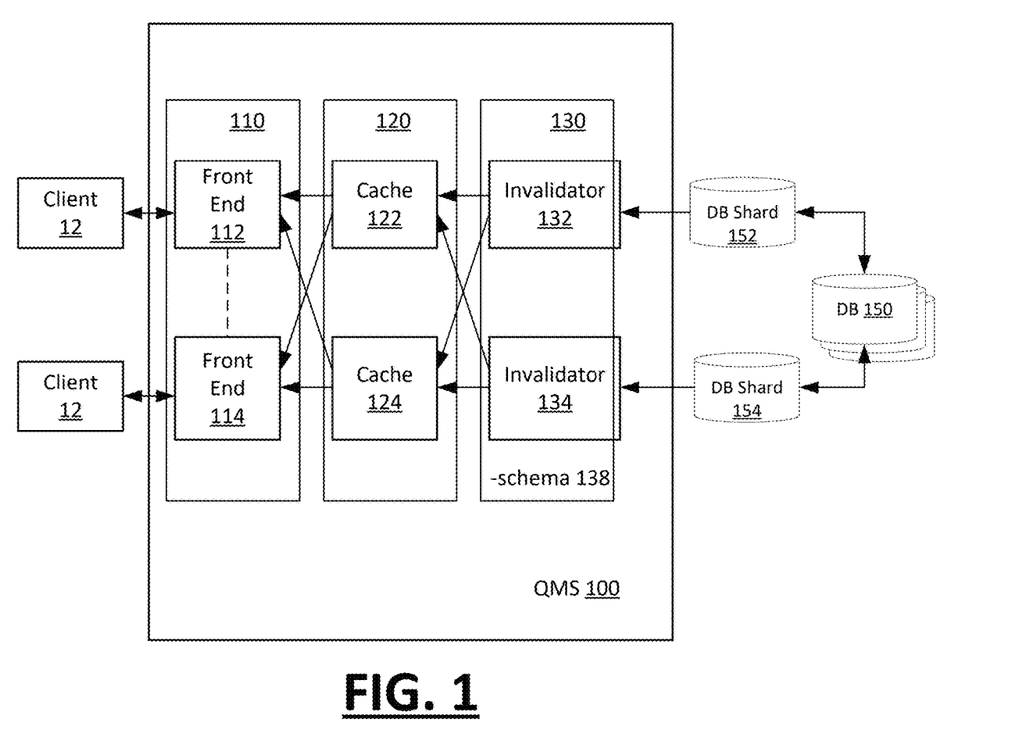
FIG. 1 illustrates a querying management system ("QMS") for use with an application service platform, according to one or more embodiments.

Still further, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described can be carried and/or executed. In particular, the numerous machines shown with examples described include processor (s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs Query Management System FIG. 1 illustrates a querying management system ("QMS") 100 for use with an application service platform, according to one or more embodiments. The QMS 100 can be implemented in context of an application service platform, such as in context of one or multiple users that access and utilize an application service over a network. The QMS 100 can be implemented as an integrated aspect an application service platform. In variations, the QMS 100 can be implemented as a separate layer or component from an application service platform that utilizes structured data sources. The QMS 100 can be accessed and used by a plurality of client terminals 12. The client(s) 12 may generate the queries that are processed and returned by the QMS 100. The QMS 100 can provide, for example, supplemental data that is responsive and/or delivered in real-time. Such data can be generated to provide metadata, overlays, interactive features, and numerous other enhancements to an application service platform, where for example, content (e.g., graphic design, word document, dynamic content), is consumed, collaborated on, or shared.

With further reference to FIG. 1, the QMS 100 includes a frontend layer 110, a cache layer 120, and an invalidation layer 130. The QMS 100 can also include and/or access structured data sources 150, 152 for use with the application service platform.

In examples, the frontend layer 110 includes processes that connect with client terminals 12, such as via a web socket connection. The frontend layer 110 can implement a frontend component 112 for each client computer 12. Each frontend component 112 maintains connections with corresponding clients 12 and with cache components 122, 124 of the cache layer. Further, each frontend component 112 can subscribe to a list of the queries on behalf of its connected clients 12. The components of the frontend layer 110 maintain a subscription of a collection of queries for one or more clients, where the collection includes cache queries. The components of the frontend layer 110 can apply a hashing function to each cached query, to associate each cached query with a particular cache resource or component 122, 124 of the cache layer 120.

The cache layer 120 can provide a query endpoint for read operations initiated by corresponding components of the frontend layer 110. The cache layer 120 can include multiple cache components 122, 124, where each cache component 122, 124 is populated by data maintained by a corresponding portion of the structured data source 150. For example, each cache component 122, 124 can be populated with data from one or more database shards 152, 154 or portions thereof. Further, each cache component 122, 124 can receive read queries from each client 12, via corresponding frontend components 112, 114, and the cache components 122, 124 return respective results to the queries generated for each client 12. In this way, the cache layer 120 facilitates each client's ability to acquire view data for use with the application service platform.

The invalidation layer 130 includes processes that invalidate cache data based on the occurrence of mutations with the database shards 152, 154. Each data source (e.g., database shard 152, 154) can be associated with one or more invalidators 132, 134. The components of the invalidation layer 130 receive mutations from the database shards 152, 154, where the mutations include variations amongst field values in successive rows of a corresponding database shard. When a mutation is received, the corresponding invalidator 132, 134 invalidates corresponding cache keys from the cache components 122, 124, causing the cache component to refresh and replace the invalidated data set. The query management operations may also include triggering components of the frontend layer 110 to refresh queries that may be affected by the mutation, such that the individual clients do not inadvertently receive data that is stale or otherwise mutated on the backend.

In examples, the invalidation layer 130 includes or is associated with a query schema 138. The query schema 138 can include or otherwise define multiple query templates, where each query template specifies at least one condition. For a given query template, the condition specifies a field ("condition field") corresponding to one of the columns of the data source structure. The condition can also specify a mathematical operator (e.g., "=", ">", "<" etc.) and/or logical operator (e.g., "AND", "OR", "NOT", etc.). The condition can also specify a value, which can be either a constant or a parameter. As described with examples below (see FIG. 3A-C, FIG. 4A-4C, FIG. 5A-5C), when the parameters of a query template are replaced by an actual value, the query template can function as an actual query.

As described with other examples, the condition of a query template can also specify when wildcard designations are to be used (e.g., '*'). The query template can include or provide for the use of a wildcard designation when the condition specified in the query template is indefinite or unbound. In specific examples, the wildcard value can be used with the query template when the specified condition of the query template is a logical expression other than "AND" (e.g., "OR"). As an addition or variation, the wildcard value can be used with the query template when the specified condition of the query template specifies an unbound range (e.g., using ">" or "<").

Additionally, in examples, the query templates can be used as command templates. Each query template can specify at least one condition, including a condition field and an operator. The command format can specify a value for the condition field of at least one condition. As a command template, the logic of the QMS 100 can specify commands relating to the mutated data sets. In context of cache management operations, the command format can enable the use of a wildcard for a value of the condition field of at least one condition. For example, the components of the frontend layer 110 can implement cache queries by implementing hashing function using the wildcard value. In similar fashion, the components of the invalidation layer 130 can also use the wildcard values to invalidate cache data sets of cache components 122, 124, which can be specified in the command.

In examples, the invalidators 132, 134 receive mutations from the corresponding database shards 152, 154. When the invalidators 132, 134 detect a mutation in a field of a corresponding data source 152, 154, the respective invalidators 132, 134 maps the mutation to one or more of the query templates, based on the field that is mutated. The respective invalidators 132, 134 can further utilize the associated command template of each query template to generate invalidation commands that invalidate the cache keys for the mutated data set. The invalidation commands can also cause the invalidated cache data to be refreshed, such as in response to a query transmitted from a client computer.

In some examples, the invalidators 132, 134 have a priori knowledge as to which cache components 122, 124 contain specified queries. In this way, the invalidators 132, 134 can direct query management commands to invalidate cache keys at specific cache resources where those cache keys reside.

Methodology

Figure 2A:
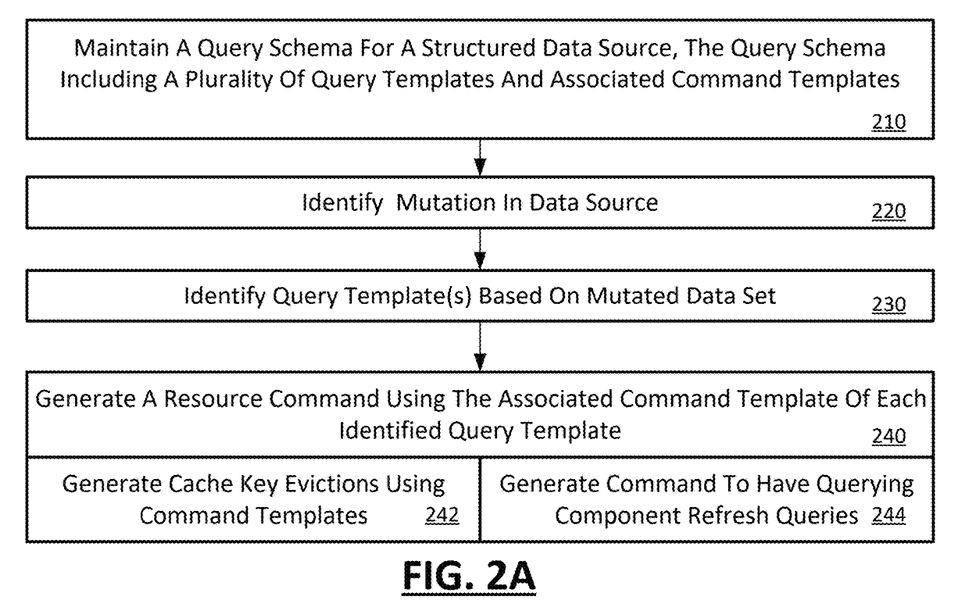
FIG. 2A and FIG. 2B illustrate example methods for implementing query management operations, according to one or more embodiments.
Figure 2B:
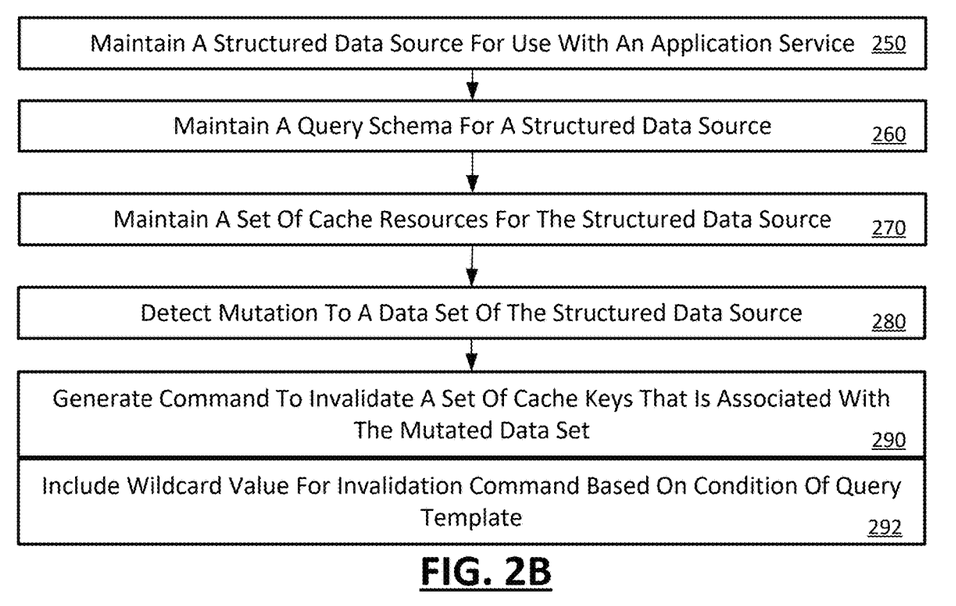

FIG. 2A and FIG. 2B illustrate example methods for implementing query management in an application service platform, according to one or more embodiments. Methods such as shown and described with examples of FIG. 2A and FIG. 2B can be implemented using a query management system such as described with an example of FIG. 1. FIG. 3A-FIG. 3C, FIG. 4A-FIG. 4C and FIG. 5A-FIG. 5C illustrate example implementations of the method as shown with FIG. 2A and FIG. 2B.

With reference to FIG. 2A, in step 210, the QMS 100 maintains a query schema for a structured data source, where the query schema includes a plurality of query templates and command templates.

In step 220, the QMS 100 identifies a mutation in a data source that is managed by the QMS 100. The mutation can be detected by, for example, comparing rows of the database shards 152, 154.

In step 230, the QMS 100 identifies query templates based on the mutated data set. In examples, the query templates can be pre-determined and stored as part of the query schema 138.

In step 240, a resource command is generated using the associated command template of each identified query template. For example, the resource command can include a command to invalidate cache keys corresponding to the mutated data set.

In step 242, cache key invalidations are implemented using command templates, where each command template is based on a query template. As an addition or variation, in step 244, the QMS 100 generates a command to have the querying component refresh queries.

With reference to FIG. 2B, in step 250, the QMS 100 maintains a structured data source for use with an application service provided to a set of user computers. For example, the QMS 100 can be implemented as part of a network system that provides a graphic design application to client computers. In such an example, the QMS 100 can provide a metadata service that supplements the graphic design application to the client computers. The metadata service can provide, for example, a comment layer where users provide comments to a shared graphic design.

In step 260, the QMS 100 maintains query schema 138 for a structured data source, such as a database where account files and metadata is maintained. The query schema 138 can include a plurality of query templates, where each query template specifies at least one condition, including a condition field and an operator, where each query template is associated with one or more types of data sets of the structured data source (e.g., database shards 152, 154).

In step 270, the QMS 100 maintains a set of cache resources for the structured data source, as represented by the cache layer 120 and cache components 122, 124.

In step 280, the QMS 100 detects a mutation to a data set of the structured data source. For example, the QMS 100 can detect mutations by comparing row sets of the database shards 152, 154.

In step 290, based on the data set(s) of the mutation, the QMS 100 generates a command to invalidate a set of cache keys that is associated with the mutated data set. The command can be generated based on the query template that is associated with the mutated data set, and the query template can be populated using attributes of the mutated data set.

In sub-step 292, based on attributes of the query template, the QMS 100 can generate a command that utilizes a wildcard value. For example, the invalidation command can specify a wildcard value. The wildcard value wherein generating the command includes designating a wildcard as a value of the query template based on a condition of the query template. The use of the wildcard value can enable the processes of the QMS 100 to implement the cache key invalidation when the condition of the query template is, for example, indefinite, unbound or otherwise costly to determine.

Query Schema Examples

Figure 3A:
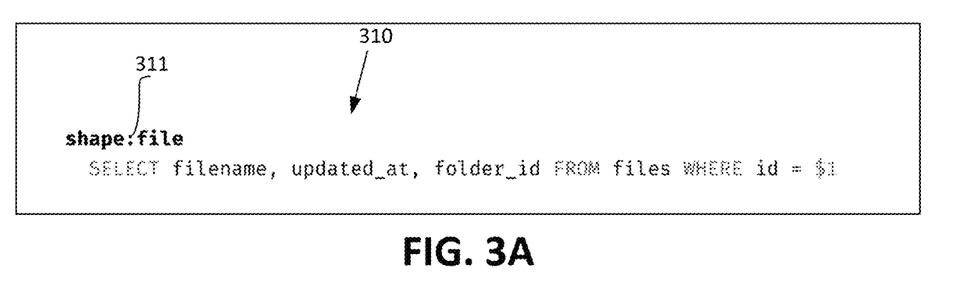
FIG. 3A through FIG. 3C illustrates an example for utilizing a query template to generate commands for implementing query management operations, according to one or more embodiments.
Figure 3B:
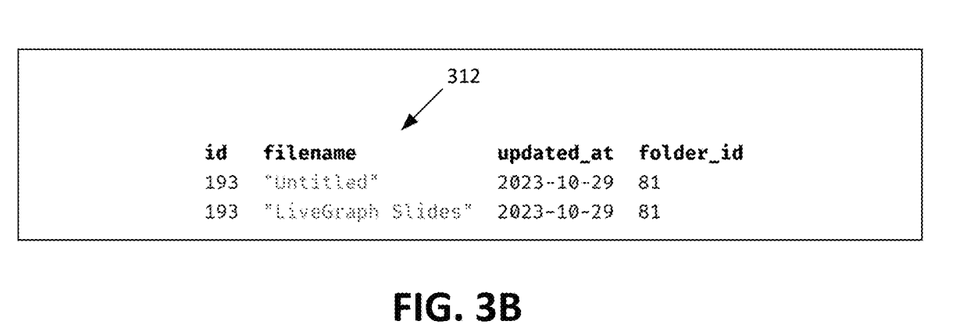
Figure 3C:
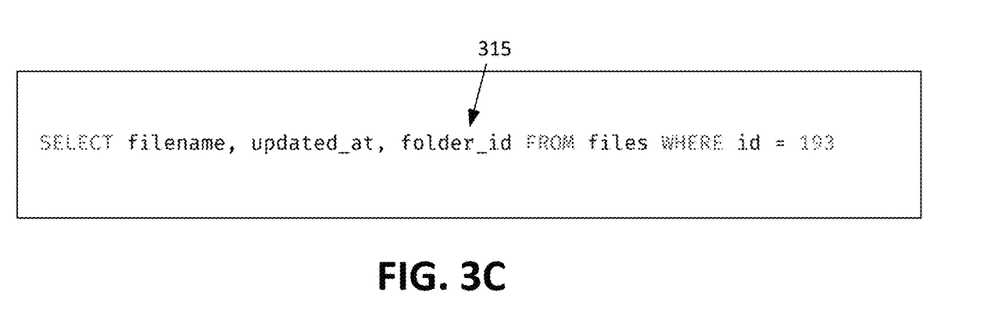

FIG. 3A through FIG. 3C illustrates an example in which a query template is used to specify a cache invalidation operation for cached data that corresponds to a mutation of the structured data source 150, according to one or more embodiments. As shown by an example of FIG. 3A through FIG. 3C, a query template 310 is matched to a database mutation, and the query template 310 is then used to generate a cache invalidation command for cache keys that correspond to the detected mutation. With reference to FIG. 3A, the query template 310 is structured in accordance with a predetermined format or template. The query template 310 is characterized by a query template identifier 311 and a query template shape (or structure). The schema 138 can include numerous query templates, where each query template includes a corresponding query identifier and query shape, where each query template is structured for a particular data set or type of data set of the database shard 152, 154. The query template shape can include specific fields that correspond to, or are based on, the corresponding type of data set on the respective database shard 152, 154. In an example of FIG. 3A, the query template 310 specifies a set of operations (e.g., SELECT", 'FROM", "WHERE") that are to be included with queries of that template. The query template also specifies a set of fields for each operation (e.g., "filename", "updated_at", "folder_id"). The query template further defines a condition of the query template 310, where the condition is an argument. As an addition or variation, the query template 310 includes or is otherwise associated with mapping logic, where mutated data sets (e.g., in successive rows) are matched to the query template 310.

FIG. 3B illustrates a mutated data set 312 from a portion of a structured data store 150. In the example shown, the mutation may be the result of a user changing the file name of a file. The data set 312 includes row-wise data, representing the values of fields (identified by columns). As described with other examples, the invalidators 132, 134 can receive the mutations from the data sources 152, 154. The mutations can be caused by, for example, clients or other components generating, or causing generation of, write queries that affect the database shards 152, 154. In the specific example shown, the mutation is indicated by the change in the value of the field ("file_name"), for a file associated with the field "id"=193 (e.g., user changes a file name from "untitled" to "LiveGraph Slides"). As described with other examples, when a mutation is detected, field(s) from the row where the mutation occurred is matched to one or more query templates. The matching can, for example, include matching the mutated field to the condition or condition field of the query templates. As an addition or variation, the structure of the row-wise data (or portion thereof) where the mutation is detected is matched to the shape (or template structure) of one or more query templates. For example, a combination of the fields that are mutated or changed and those that are unchanged can be matched to the structure of individual query templates. Still further, as described, the query schema 138 and/or query templates can include or otherwise be associated with logic that maps a mutation of a given field to a specific query template, or set of query templates.

FIG. 3C illustrates an invalidation command 315 for cache keys that corresponds to the mutated data set 312 of FIG. 3B. The invalidation command 315 is an example of a query management command that can be generated by QMS 100, using query templates 310 of the schema 138. In the example shown, the query management commands can include invalidation commands directed to the cache layer 120. In variations, the query management commands can be directed to respective frontend components 112, 114 of the frontend layer 110, to cause the respective frontends to refresh active queries (of subscribers) that match to the query generated from the query template 310 and the matching mutated data set 312.

Figure 4A:
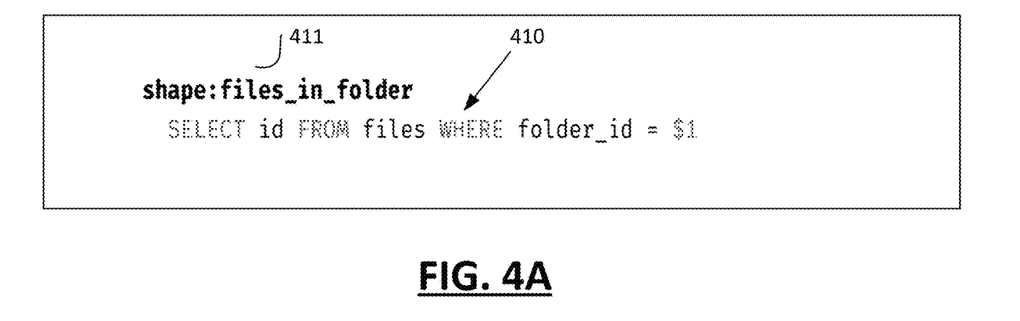
FIG. 4A through FIG. 4C illustrates another example for utilizing a query templates to generate commands for implementing query management operations, according to one or more embodiments.
Figure 4B:
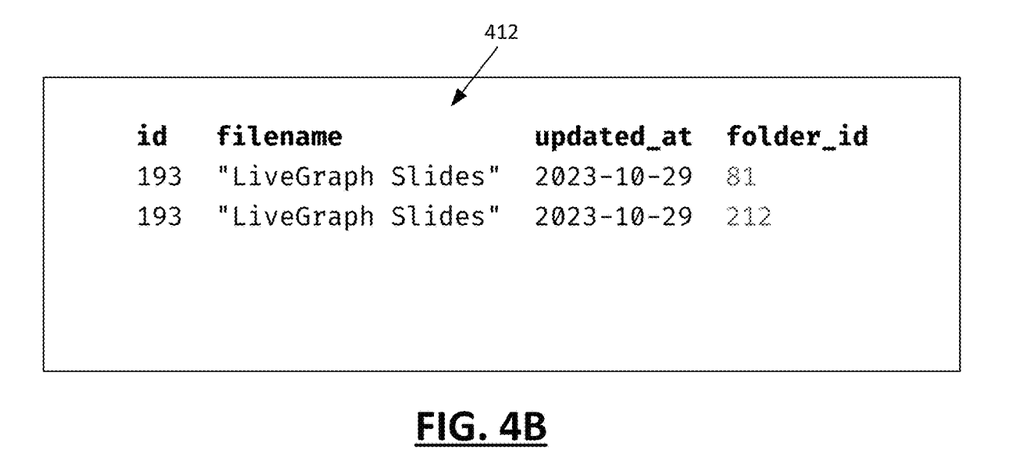
Figure 4C:
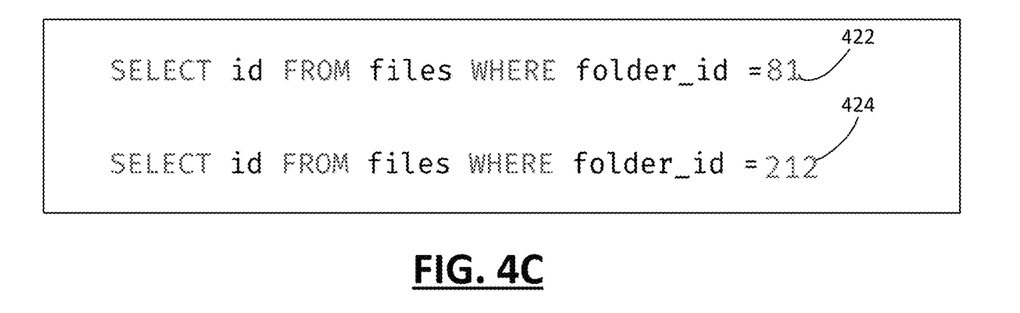

FIG. 4A through FIG. 4C illustrates another example in which a query template is used to specify a cache invalidation operation, according to one or more embodiments. As with the prior example, a query template 410 includes a template identifier 411. Further, the query template is characterized by a shape or structure, reflecting, for example, particular fields that are present with the query. The query template 410 can also include or be associated with mapping logic that identifies, for example, specific fields that are markers (i.e., can be matched) for the query template when mutated. In the particular example, a change in folder_id can map to the query template, reflecting a scenario where, for example, a user moves a file from a first folder (e.g., folder_id=81) to a second folder (e.g., folder_id 212).

FIG. 4B illustrates a mutated data set 412 from a portion of a structured data store 150, coinciding with a user moving a file from the first folder (81) to the second folder (212). Components of the invalidation layer 130 detect the mutated data set 412, and match the mutated data set to the query template 410.

In FIG. 4C, query management operations, in the form of cache invalidation commands 422, 424, are shown. Each cache invalidation commands 422, 424 identifies queries that utilize different elements of the mutated data set. In the particular example, the first invalidation command 422 specifies a query for the source folder where the file was originally located before being moved, and the second invalidation command 424 specifies the destination folder where the file was moved to. Thus, each invalidation command 422, 424 specifies queries that use different rows of the mutated data set. The invalidation layer 130 (or other components of the QMS 100) can use the invalidation commands 422, 424 to invalidate cache keys that match to the respective queries of the commands 422, 424. As an addition or variation, the invalidation layer 130 (or other components of the QMS 100) can use the query template 410 to specify additional query management commands for additional components, such as the frontend components 112, 114.

Figure 5A:
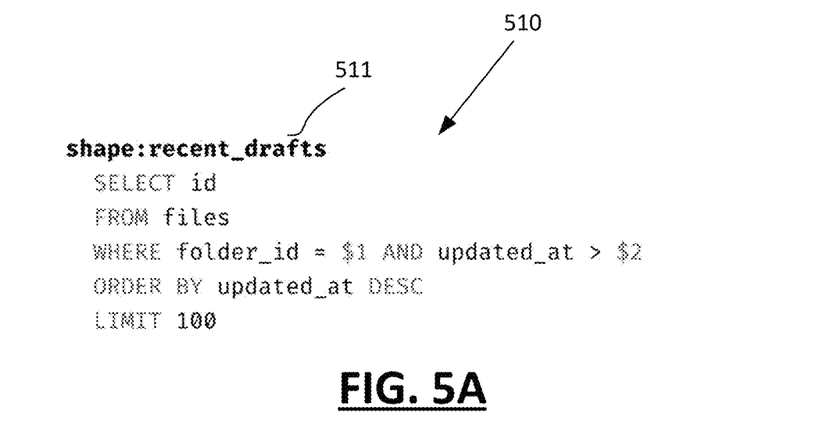
FIG. 5A through FIG. 5C illustrates another example for utilizing a query templates to generate commands for implementing query management operations, according to one or more embodiments.
Figure 5B:
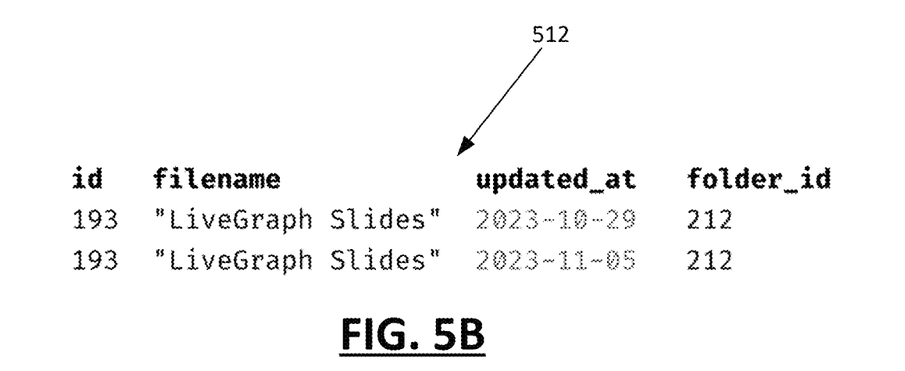
Figure 5C:
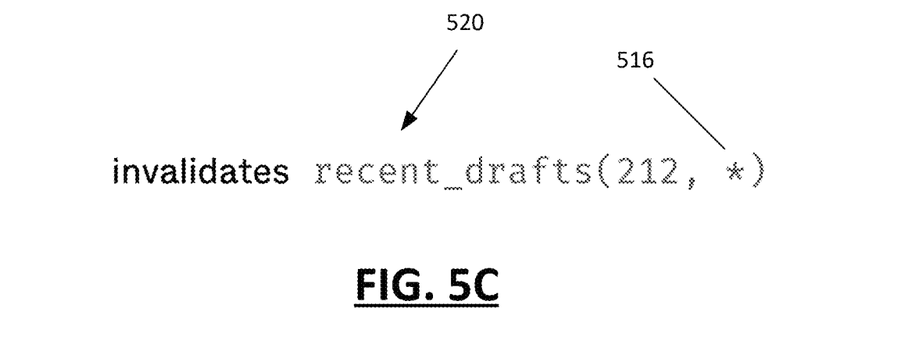

FIG. 5A through FIG. 5C illustrates another example in which a query template is used to specify a cache invalidation operation, according to one or more embodiments. As with the prior example, a query template 510 includes a template identifier 511, where the query template is characterized by a shape or structure, reflecting, for example, particular fields that are present with the query, as well as one or more conditions (e.g., WHERE), condition field(s) (e.g., "folder_id", "updated_at"), and operators and/or logical expressions of the conditional field. The query template 510 can represent, for example, a query to list the files of a user's draft folder after a particular date (e.g., last seven days). If the user's draft folder is updated, the QMS 100 can use the query 510 to generate cache invalidation operations to invalidate the corresponding cache keys. Likewise, the QMS 100 can trigger a corresponding frontend component 112, 114 to refresh the queries for the draft folder. However, examples recognize that the QMS 100 cannot identify each active query that matches to query template 510, as the condition of the query template specifies an open ended range. In other words, the condition of the query template 510 is unbound.

FIG. 5B illustrates a mutated data set 512 from a portion of a structured data store 150, coinciding with, for example, the drafts folder being updated at successive times. The mutated data set 512 can be matched to one or more query templates of the query template 510.

FIG. 5C represents a cache invalidation command 520 that includes a wildcard designation for an argument. Through use of the wildcard designation, the invalidation command 520 operates to invalidate a set of cache keys corresponding to the mutated data set, which in the example shown, relate to a particular folder (folder_id=212). As described with other examples, the invalidation command 520 can be generated from logic associated with the query schema and/or query template 510. The query template 510 can specify, for example, that data mutations reflecting changes to the field updated_at for folders are to be associated with a query command template that uses the field value for folder_id which is associated with the mutated data, along with a wildcard value 516 for the updated_at field. The QMS 100 can apply the invalidation command 520 to the cache keys that match the template 510 with the wildcard designation. For example, the invalidation command 520 can be applied to cache keys that specify the folder_id value as being "212", regardless of the value specified for the "updated_at" field. As a result, cache keys that match invalidation command 520 are invalidated. Additionally, the invalidation command 520 can cause the corresponding frontend components 112, 114 to refresh queries that correspond to the invalidated cache keys.

Query Management System Enhancements

Additionally, in some examples, components 112, 114 of the frontend layer 110 can apply a hashing function to queries for cached data sets. Likewise, the invalidators 132, 134 can, in response to mutations, apply the hashing function to cache components 122, 124, to further direct their respective queries to the cache component where the targeted cache keys reside.

With reference to example FIG. 5A through 5C, the frontend components 112, 114, can apply wildcard values to the hashed queries to cause their queries to be cached at a cache component 122, 124 where wildcard invalidation commands are directed. In this way, the application of the wildcard by the invalidators 132, 134 does not affect the cache that should be targeted for implementation of the command.

In additional examples, the QMS 100 can generate a cache key that serves as a node for a collection of cache keys (or a "node cache key"). A node cache key can include the following characteristics: (i) it is defined in part by a wildcard designation, and (ii) a value associated with the node cache key is randomly generated (e.g., a randomly generated number). The cache keys in the collection that are associated with the node cache key can be appended to include the random value associated with the node cache key. In this way, if the node cache key is invalidated, all of the cache keys in the associated collection are effectively invalidated as well, as the randomly determined value that is used to identify the cache keys of the collection is lost when the node cache key is invalidated. By invalidating the node cache key, the associated cache keys can also effectively be invalidated. This allows for the components of the invalidation layer 130 to invalidate a segment of a cache resource at one time, simply by invalidating the node cache key for that segment.

In directing command queries to the frontend components 112, 114, the cache components 122, 124 can utilize probabilistic filters (e.g., such as a cuckoo filter) to selectively invalidate or eliminate queries. Probabilistic filters are data structures that can be queried for its membership. By maintaining a probabilistic filter that identifies the subscribed queries, the cache components 122, 124 can identify which frontend components 112, 114 contain a subscription that is a source for an invalidated set of cache keys. Thus, for example, if an invalidation command causes a set of cache keys to be invalidated, the cache components 122, 124 can use a probabilistic filter to identify which frontend component 112, 114 utilizes a subscription that queries the invalidated cache keys. Once identified, the frontend component 112, 114 can be triggered to refresh its query from the corresponding database shard 152, 154.

Hardware Diagram

Figure 6:
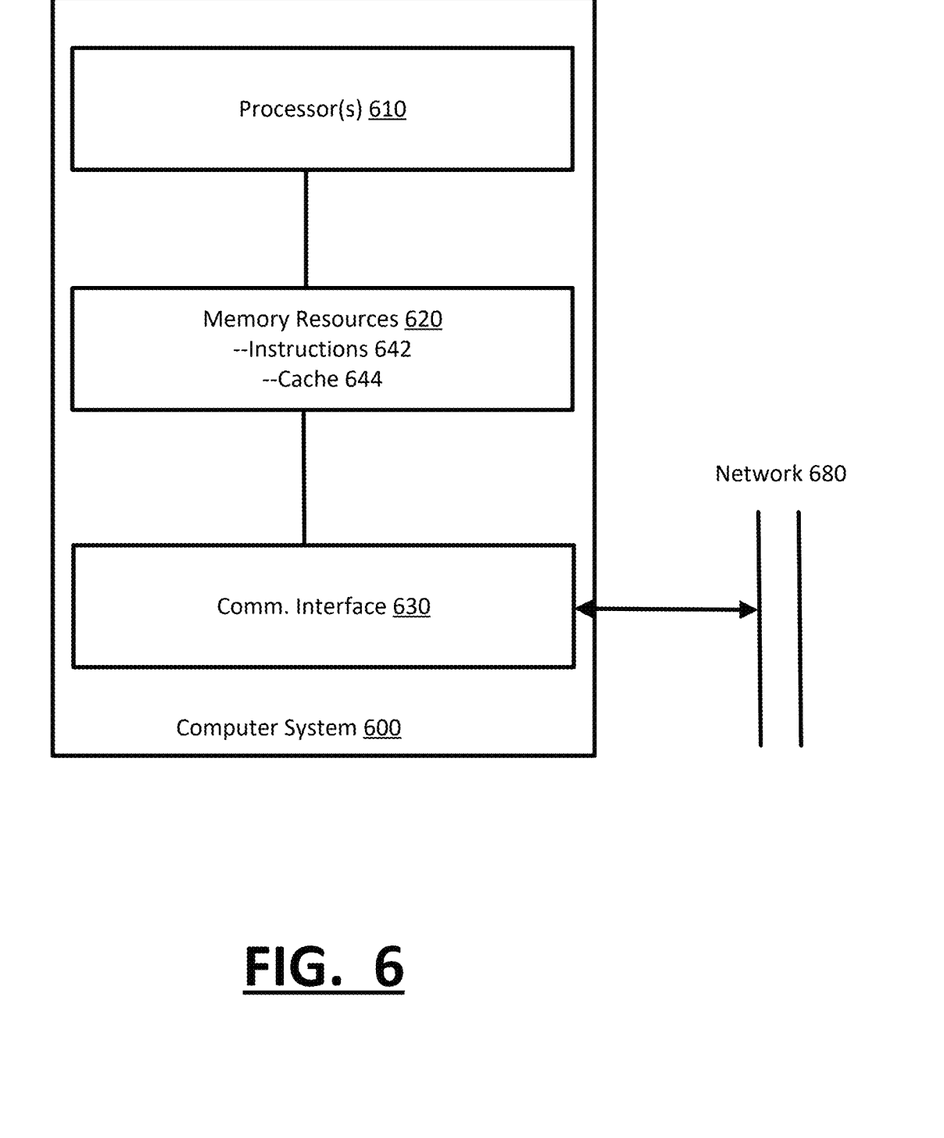
FIG. 6 illustrates a hardware diagram for a computer system that can be used with one or more embodiments.

FIG. 6 is a block diagram that illustrates a computer system upon which one or more embodiments described herein may be implemented. For example, in the context of FIG. 1, the QMS 100 can be implemented using a network computer system or combination of network computer systems, such as described with an example of FIG. 6. Additionally, methods such as described with examples of can be implemented using a computer system such as described with an example of FIG. 6.

In one implementation, the computer system 600 includes one or more processors 610, memory resources 620, and a communication interface 630. The computer system 600 includes at least one processor 610 for processing information. The memory resources 620 may include a random-access memory (RAM) or other dynamic storage device, for storing information and instructions to be executed by the processor(s) 610. The memory resources 620 also may be used for storing temporary variables or other intermediate information during execution of instructions to be executed by the processor(s) 610. The memory resources 620 can also include cache resources 644 and database resources, as described with various examples. The computer system 600 may also include other forms of memory resources, such as static storage devices for storing static information and instructions for the processor 610. The memory resources 620 can store information and instructions, including instructions 642 for implementing QMS 100, as described with examples. Additionally, the processor(s) 610 can execute the instructions 642 to implement methods such as described herein.

The communication interface 630 can enable the computer system 600 to communicate with one or more networks 680 (e.g., cellular network) through use of the network link (wireless or wireline). Using the network link, the computer system 600 can communicate with one or more other computing devices and/or one or more other servers or data centers.

Examples described herein are related to the use of the computer system 600 for implementing the techniques described herein. According to one embodiment, those techniques are performed by the computer system 600 in response to the processor 610 executing one or more sequences of one or more instructions contained in the memory resources 620. Such instructions may be read into the memory resources 620 from another machine-readable medium, such as the storage device. Execution of the sequences of instructions contained in the memory resources 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

CONCLUSION

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude having rights to such combinations.

What is claimed is:

1. A network system comprising:
   one or more processors;
   a memory to store a set of instructions;
   wherein the one or more processors execute the set of instructions to perform operations that include:
      maintaining a structured data source for use with an application service provided to a set of user computers;
      maintaining a query schema for a structured data source, the query schema including a plurality of query templates, each query template specifying at least one condition, including a condition field and an operator, each query template of the plurality of query templates being associated with one or more types of data sets of the structured data source;
      maintaining a set of cache resources for the structured data source;
      detecting a mutation to a data set of the structured data source;
      based on the data set of the mutation, generating a command to invalidate a set of cache keys, the command being based on a query template of the query schema that is associated with the mutated data set, the command populating the query using one or more attributes of the data set; and
      wherein generating the command includes designating a wildcard as a value of the query template based on a condition of the query template.

2. The network system of claim 1, wherein the structured data source includes multiple shards of a database, and wherein the set of cache resources include one or more cache components for each of the multiple shards.

3. The network system of claim 1, wherein the operations further comprise:
   generating a node cache key for a collection of cache keys, then node cache key being defined at least in part by a wildcard designation, wherein the node cache key is associated with a random value; and
   wherein each cache key of the collection is appended to include the random value.

4. The network system of claim 3, wherein the operations include:
   enabling a user device to invalidate the node cache key to effectively invalidate each cache key of the collection.

5. The network system of claim 3, wherein the operations include:
   in response to detecting that the data set of mutation is identified by one or more cache keys of the collection, invalidating the node cache key.

6. The network system of claim 1, wherein each query template specifies a condition that is defined in part by at least one of an operator or logical expression, and wherein the command designates the wildcard as the value based on the operator or logical expression.

7. The network system of claim 1, wherein the command designates the wildcard as the value when the condition of the query template is unbound or indefinite.

8. A computer-implemented method for managing queries, the method comprising:
   maintaining a query schema for a structured data source, the query schema including a plurality of query templates, each query template specifying at least one condition, including a condition field and an operator, and wherein the query schema associates a command template with each query template, each command template specifying a field value for the condition field of the associated query template;
   wherein for a first query template of the plurality of query templates, the associated command template includes a wildcard as a field value for the condition field;
   identifying a mutation to a field of the structured data source;
   in response to identifying the mutation, (i) matching the mutation to at least one query template based; and (ii) generating at least one command, using the associated command template of the matched query, the generated command that specifies the field value and the condition field for the at least one condition of the identified query template, wherein for the first query template, the resource command specifies the wildcard for the condition field.

9. The computer-implemented method of claim 8, wherein the resource command is an invalidation command to invalidate, from a cache resource of the structured data source, any cache key that matches the field value for the condition field of the at least one condition.

10. The computer-implemented method of claim 9, wherein for the resource command of the first query template, the invalidation command identifies a plurality of cache keys that match the wildcard for the condition field of the at least one condition of the first query template.

11. The computer-implemented method of claim 10, wherein for the resource command of the first query template, the invalidation command identifies one of multiple caches where the cache keys that are to be invalidated reside.

12. The computer-implemented method of claim 9, wherein the resource command is a refresh command to cause a frontend resource to refresh a set of queries that match the field value for the condition field of the at least one condition.

13. The computer-implemented method of claim 12, wherein the refresh command includes a probabilistic filter.

14. The computer-implemented method of claim 8, wherein for the first query template, the operator includes a mathematical operator that at least partially defines a range of field values.

15. The computer-implemented method of claim 8, wherein for at least some of the plurality of query templates, the at least one condition includes a logical operation.

16. The computer-implemented method of claim 8, wherein for the first query template, the operator includes an OR operator.

17. A non-transitory computer-readable medium that stores instructions, the instructions being executable by one or more processors of a query management system, to cause the query management system to perform operations comprising:
   maintaining a structured data source for use with an application service provided to a set of user computers;
   maintaining a query schema for a structured data source, the query schema including a plurality of query templates, each query template specifying at least one condition, including a condition field and an operator, each query template of the plurality of query templates being associated with one or more types of data sets of the structured data source;
   maintaining a set of cache resources for the structured data source;
   detecting a mutation to a data set of the structured data source;
   based on the data set of the mutation, generating a command to invalidate a set of cache keys, the command being based on a query template of the query schema that is associated with the mutated data set, the command populating the query using one or more attributes of the data set; and
   wherein generating the command includes designating a wildcard as a value of the query template based on a condition of the query template.

18. The non-transitory computer-readable medium of claim 17, wherein the operations further comprise:
   generating a node cache key for a collection of cache keys, the node cache key being defined at least in part by a wildcard designation, wherein the node cache key is associated with a random value; and
   wherein each cache key of the collection is appended to include the random value.

19. The non-transitory computer-readable medium of claim 18, wherein the operations include:
   enabling a user device to invalidate the node cache key to effectively invalidate each cache key of the collection.

20. The non-transitory computer-readable medium of claim 17, wherein each query template specifies a condition that is defined in part by at least one of an operator or logical expression, and wherein the command designates a wildcard as the value based on the operator or logical expression.

* * * * *